(12) United States Patent
Muller et al.

(10) Patent No.: US 6,635,316 B1
(45) Date of Patent: Oct. 21, 2003

(54) METHOD FOR PRODUCING AN ACID-RESISTANT, ELECTRICALLY CONDUCTIVE BUILDING MATERIAL COVERING

(75) Inventors: Claus-Michael Muller, Essen (DE); Eugen Kleen, Schermbeck (DE)

(73) Assignee: CRC Chemical Research Company Ltd., Monaghan (IE)

( * ) Notice: Subject to any disclaimer, the term of this patent is extended or adjusted under 35 U.S.C. 154(b) by 0 days.

(21) Appl. No.: 09/937,977

(22) PCT Filed: Mar. 30, 2000

(86) PCT No.: PCT/EP00/02837

§ 371 (c)(1),
(2), (4) Date: Jan. 29, 2002

(87) PCT Pub. No.: WO00/59843

PCT Pub. Date: Oct. 12, 2000

(30) Foreign Application Priority Data

Apr. 1, 1999 (DE) .......................... 199 15 093

(51) Int. Cl.[7] .............................. B05D 5/12; B05D 3/02
(52) U.S. Cl. ...................... 427/397.8; 427/58; 427/256; 427/287
(58) Field of Search ................. 427/256, 287, 427/397.8, 58

(56) References Cited

U.S. PATENT DOCUMENTS 4,162,166 A * 7/1979 Walls-Muycelo ............ 501/80
4,870,795 A * 10/1989 Bard et al. ................... 52/389

FOREIGN PATENT DOCUMENTS

| EP | 641748 A | * 3/1995 | |
| EP | 884434 A | * 12/1998 | |
| JP | 11071164 A | * 3/1999 | ........... C04B/28/26 |

OTHER PUBLICATIONS

Derwent publication of Patent ZA 8802627 A, Nov. 1988.*

* cited by examiner

Primary Examiner—Michael Barr
(74) Attorney, Agent, or Firm—Blakely, Sokoloff, Taylor & Zafman

(57) ABSTRACT

A method of producing acid resistant anti-static building material covering is presented. The method uses a pasty or liquid joint filling mixture of alkali metal silicate binder and powder components. The production of an acid resistant and electricity dissipating building material covering on a mechanically stable substrate includes: (a) covering the substrate with boards laid in a conductive laying material which is contacted with a dissipation connection; (b) preparing a jointing material by mixing an alkali metal silicate binder component with a powder component in the presence of water to form a pasty or liquid jointing material; (c) filling the joints left between the boards with the jointing material; and (d) allowing the jointing material to set

21 Claims, No Drawings

METHOD FOR PRODUCING AN ACID-RESISTANT, ELECTRICALLY CONDUCTIVE BUILDING MATERIAL COVERING

The invention relates to a method of producing an acid-resistant and electrically conductive building material covering on a mechanically stable substrate, for instance on a floor or a wall.

A method of the type referred to above is disclosed in, for instance, the worksheet, p 30, from the Arbeitsgemeinschaft Industriebau e.V. (AGI) dated December 1994, which contains instructions for producing electrically conductive floor coverings. Such floor coverings are required with an acid-resistant construction where special requirements are present relating to detonation risks as a consequence of electrostatic charges, for instance in regions at risk of explosion. In order to produce such floor coverings, a sealing layer (sealing sheet or liquid film) is firstly applied to a substrate. Tiles or plates are laid on this sealing layer in a bedding material. After setting or bonding of the bedding material, the joints between the tiles or plates are filled with a grouting material. The bedding material must be electrically conductive. In order to produce contact with an earth connection, conductive copper strips are embedded in the bedding material beneath the tiles or plates. The floor coverings can be produced with continuously conductive plates, with tiles with a conductive glaze or with non-conductive plates. If continuously conductive plates are used, the grouting material can also comprise a non-electrically conductive cement or mortar. If tiles with a conductive glaze are used, conductive cement or mortar must be used both for the bedding material and for the grouting material.

The same applies when using non-conductive plates; in this case the plates should additionally not exceed a maximum size and the butt joints must be flush with the surface.

Synthetic resin cements, for example, are used as electrically conductive bedding and grouting materials, the specific resistance of which is reduced by additives, such as granular coke, graphite, carbon fibres and soot, to the extent that they have the conductivity necessary for grounding electrical charges. Hydraulically setting mortars are also used which are made to be electrically conductive by mixing in graphite or soot. The above specification defines an object as conductive if its specific resistance<$10\Omega*m$. As well as the addition of electrically conductive particles based on carbon, as an alternative the addition of metallic powders, metallic fibres or metallised glass, ceramic and plastic bodies is recommended.

Of disadvantage with the mixtures made conductive with carbon particles is, above all, their dark coloration, which limits the breadth of variation of the design possibilities, above all in the joint region. The addition of metal particles, on the other hand, can result in an impairment of the acid resistance.

It is therefore the object of the invention to provide an alternative electrically conductive and acid resistant floor covering.

In the method in accordance with the invention a mechanically stable substrate is covered with plates laid in a (for instance conventional) conductive bedding material, whereby contact of the bedding material to an earth connection is produced and whereby gaps remain between the plates. An alkali silicate bonding agent component and a powder component, which bonds with this alkali silicate bonding agent component in the presence of water, are then provided. The powder component is mixed with the alkali silicate bonding agent component in the presence of water in order to produce a pasty or liquid grouting composition; the gaps are then filled with the grouting composition, whereafter the grouting composition sets.

In the method in accordance with the invention, the starting point is the mixing in of electrically conductive carbon or metal particles, which has been practised for decades. The invention is based on the recognition that a grouting composition produced by means of an alkali silicate bonding agent component, makes sufficiently electrically conductive grouting possible. Furthermore, an alkali silicate bonding agent component permits the production of a grouting composition with an excellent chemical resistance to acid and alkali solutions and with high mechanical strength, freedom from cracking and fire resistance.

The grouting composition can be trowelled or washed into the gaps. The gaps are preferably filled with the grouting composition such that a substantially planar surface of the building material coating is formed.

It has been found that the addition of calcium oxide compounds and cement-like compounds reduce the acid resistance. The powder component should be substantially free of such compounds, this meaning that their proportion in the total mixture should be less than 3% by wt., preferably significantly below this limit. Surprisingly, it has further transpired that minerals containing iron oxide, such as garnet or biotite, also significantly impair the acid resistance, particularly under the action of sulphuric acid. A powder component is therefore preferably used which is substantially free of compounds containing iron oxide.

A mechanically stable substrate is any substrate present in the form of a floor or a wall which withstands all mechanical stresses prevailing in the specific case such that over-stressing of the applied layers or crack formation do not occur.

The powder component of the grouting composition preferably has light coloured or white components and an acid- and alkali-resistant pigment. Flexible colour design of the joints is possible with such a grouting composition.

In an advantageous embodiment of the method, a powder component is used which contains an inert filler component in an amount of up to 70% by wt. Quartz sand or a mixture of different quartz sands is preferably used as the inert filler component. The addition of the inert filler component reduces the costs of the building material mixture and can furthermore have a positive influence on the setting performance.

An alkali silicate bonding agent component is preferably used which has a molar ratio of the silicon dioxide to the alkali oxide of less than 2.3:1. In one embodiment of the method in accordance with the invention an aqueous alkali silicate solution is provided as the alkali silicate bonding agent component which is mixed with the powder component without the addition of further water. A sodium or potassium water glass solution, for instance, can be used as the aqueous alkali silicate solution, whereby a potassium water glass solution is more suitable for the production of the building material mixture by reason of its lower viscosity. The alkali silicate solution preferably has a solid material content of 40 to 50%. The powder component is preferably mixed with 5 to 50% by wt., preferably about 13 to 14% by wt. alkali silicate solution. A potassium water glass solution with a molar ratio of $SiO_2:K_2O$ of less than 2.3:1, preferably between 0.8:1 and 1.5:1, is preferably used.

In an alternative embodiment of the method in accordance with the invention, a pulverulent alkali silicate bonding agent component can be provided, whereby the pulverulent alkali silicate bonding agent component is mixed with the powder component during the preparation and the pasty or liquid grouting composition is then produced by adding water to the mixture. The pulverulent alkali silicate bonding agent component preferably constitutes 2.5 to 25% by wt. of the prepared mixture. The mixture is preferably mixed with about 5 to 25% by wt. water.

A preferred embodiment of the method in accordance with the invention is characterised in that a powder component is used which has an activated silicon dioxide component. In distinction to an inert component containing silicon dioxide, an activated silicon dioxide component is to be understood to be a component which is able to enter into a setting reaction with the alkali silicate component. An activated silicon dioxide component generally has surface active microparticles which have been produced by grinding, precipitation or deposition. At least one substance is preferably used as the activated silicon dioxide component from a group which includes pyrogenic silica, precipitated silica, silica dust, glass flour and fly ash or electrostatic filter ash with a high silicon dioxide content.

In an advantageous embodiment of the method in accordance with the invention, a powder component is used which, in addition to the activated silicon dioxide compound, contains at least one further activated component from a group of activated components, the group of activated components comprising activated aluminium oxy components and the pozzuolanic components fly ash, electrostatic filter ash, trass, burnt oil shale, ground blast furnace slag and ground foundry sand. A reactive mixture is preferably produced from the silicon dioxide component and the further activated component in which the proportion of the silicon dioxide component is less than 50%. This reactive component can be mixed with an inert component and further additives and supplements to form the powder component.

In a preferred embodiment of the method in accordance with the invention, a powder component is used which contains a reactive mixture of the activated silicon dioxide component and an activated aluminium oxy component, the content of the activated silicon dioxide component in the reactive mixture being smaller than the content of the activated aluminium oxy component and the powder component being substantially free of calcium dioxide compounds, cement-like compounds and compounds containing ion oxide. A powder component is preferably used in which the content of the activated silicon dioxide component in the reactive mixture corresponds to about 5 to 50% of the content of the activated aluminium oxy component. It has transpired that excellent mechanical strength, freedom from cracking and resistance to acid and alkali may be achieved with such a mixture. Furthermore, such a mixture permits the use or selection of components with a low inherent coloration, whereby the production of resistant, electrically conductive and light coloured joints is made possible.

The aluminium oxy component of the reactive mixture can contain aluminium silicates, such as andalusite, sillimanite, cyanite and/or mullite, or lumino-silicates, such as mica. The activated aluminium oxy component preferably includes at least 60% by wt. aluminium oxides and/or aluminium hydroxides. The activated (for instance microcrystalline or amorphous) aluminium oxides including both pure aluminium oxides such as carrandum, and also certain mixed oxides, such as spinel. The activated aluminium hydroxides can include, for instance, the minerals hydrargillite, gibbsite, bohmite, diaspor, alumogel or sporogelite; so-called active clay, bauxite or laterite, can also be used.

In a preferred embodiment of the method in accordance with the invention, the activated aluminium oxy component is calcined bauxite or hydrargillite. The term "calcined bauxite" refers to an intermediate product in the production of aluminium by the Bayer process, whereby it is substantially calcined hydrargillite. The use of calcined bauxite provides the advantage of relatively uniform quality and produces constant volume building material. A large advantage is furthermore the low inherent coloration of the powder component, which permits white or coloured pigmented coatings and grouting compositions. The acid- and alkali-resistant pigment is preferably mixed in with the powder component.

In a preferred embodiment of the method in accordance with the invention a powder component is prepared which contains about 30 to 60% by wt., preferably 40 to 50% by wt., of the reactive mixture, the reactive mixture containing 5 to 90% by wt., preferably 40 to 80% by wt., of the aluminium oxy component and 4 to 40% by wt., preferably 8 to 15% by wt., of the silicon dioxide component. It has been found that the content of the silicon dioxide component should be significantly smaller than that of the aluminium oxy component. In an advantageous embodiment the powder component contains up to 40% by wt., preferably 2 to 4% by wt., foundry sand flour. Furthermore, glass flour, ground blast furnace slag and/or ground blast furnace sand can be added to the powder component as components of the reactive mixture.

Further advantageous embodiments of the method in accordance with the invention are characterised in the dependent claims.

A preferred embodiment of the method in accordance with the invention is given below in which building material mixtures are used, both for a bedding material for plates or tiles and also for the grouting material, which are produced by mixing a powder component with an alkali silicate bonding agent component in the presence of water, the powder component including a reactive mixture containing an activated silicon dioxide component and activated aluminium oxy component.

Firstly, the mechanically stable substrate, i.e. a standard screed or concrete, is prepared in the conventional manner. A sealing layer, for instance, is applied to it.

A powder component is then prepared, which has a reactive content (also referred to as the bonding agent content) of about 45% by wt. It also contains an inert quartz sand mixture content of about 53% by wt. Other impurities and adjuvants of the powder component (for instance fibres and wetting agents) account for about 2% by wt.

The powder component is free of cement and cement-like compounds, long chain organic compounds (polymers), calcium compounds (particularly lime) and iron compounds. The presence of cement, cement-like compounds or calcium compounds would destroy the acid resistance. It has transpired surprisingly that iron-containing minerals, such as garnet or biotite, also significantly impair the acid resistance, particularly under the action of sulphuric acid.

The reactive mixture of the powder component contains a relatively small proportion of silica dust and/or pyrogenic silica, which is preferably 4 to 7% by wt. of the powder component. The reactive mixture also contains calcined bauxite, constituting an activated aluminium oxy component, up to an amount which is about 25 to 35% by wt. of the powder component. Furthermore, the reactive mixture of the powder component can contain fly ash, foundry sand, blast furnace slag and/or alumosilicate and aluminium silicate compounds.

A potassium water glass solution is also prepared which has a solid content of 45 to 50% by wt., preferably about 50%. The prepared powder component is mixed with the potassium water glass solution, whereby a pasty alkali silicate mortar is produced. An amount preferably of 13 to 14% by wt. of the 50% potassium water glass solution is added to the powder component.

The alkali silicate mortar is applied to the prepared substrate. Before the application of the alkali silicate mortar to the prepared substrate, a copper strip is positioned in a grid of 5×5 m. The intersection points of the copper strip are connected by solder connections. Contact is also produced with an earthing connection. The pasty building material mixture can then be applied, into which the tiles are laid. In order to prevent mechanical destruction of the copper strip when applying the mortar, the conductive strip can alternatively be pressed into the freshly applied building material mixture. Acid-resistant tiles are then laid before setting of the mortar. The tile size should not exceed 15×15 cm$^2$.

After a setting time of at least 24 hours, a powder component and potassium water glass solution are again prepared. A grouting composition is mixed from the two components. The powder component prepared for the grouting composition contains a reactive mixture with a low inherent coloration, an inert filler component of light coloured quartz sand and acid- and alkali-resistant pigments. For instance, white pigment is used in an amount of about 3%. The prepared powder component is mixed with about 13 to 14% by wt. alkali silicate solution.

The gaps are then filled by trowelling or pouring in the grouting composition. The grouting is so performed that the joint gap is filled flat, i.e. the normally concave washout is avoided.

The grouting composition is then permitted to set.

What is claimed is:

1. A method of producing an acid-resistant and electrically conductive building material coating on a mechanically stable substrate, wherein:
   a) the substrate is covered with plates laid in a conductive bedding material, contact of the bedding material with an earthing connection being produced and gaps remaining between the plates;
   b) a grouting composition is prepared by mixing an alkali silicate bonding agent component with a powder component in the presence of water in order to produce a pasty or liquid grouting composition, whereby a powder component is used, which sets with the alkali silicate bonding agent component in the presence of water;
   c) the gaps are filled with the grouting composition; and
   d) the grouting composition is permitted to set.

2. The method as claimed in claim 1, wherein the grouting composition is trowelled into the gaps.

3. The method as claimed in claim 1, wherein the grouting composition is poured into the gaps.

4. The method as claimed in claim 1, wherein the gaps are so filled with the grouting composition that a substantially planar surface of the building material covering is formed.

5. The method as claimed in claim 1, wherein a powder component is used which is substantially free of compounds containing iron oxide.

6. The method as claimed in claim 1, wherein a powder component is prepared which contains an inert filler component in an amount of up to 70% by wt.

7. The method as claimed in claim 1, wherein the alkali silicate bonding agent component has a molar ratio of the silicon dioxide to the alkali oxide of less than 2.3:1.

8. The method as claimed in claim 1, wherein an aqueous alkali silicate solution is prepared as the alkali silicate bonding agent component, which is mixed with the powder component without the addition of further water.

9. The method as claimed in claim 8, wherein a powder component is used which has an activated silicon dioxide component.

10. The method as claimed in claim 9, wherein the powder component is mixed with 5–50% by wt. alkali silicate solution and the alkali silicate solution has a solid material content of 40–50% by wt.

11. The method as claimed in claim 10, wherein the powder component is mixed with 13–14% by wt. alkali silicate solution.

12. The method as claimed in claim 9, wherein the alkali silicate solution is a potassium water glass solution with a molar ratio of $SiO_2$:$K_2O$ smaller than 2.3:1.

13. The method as claimed in claim 12, wherein the molar ratio is in the range between 0.8:1 and 1.5:1.

14. The method as claimed in claim 1, wherein a pulverulent alkali silicate bonding agent component is prepared, the pulverulent alkali silicate bonding agent component is mixed with the powder component during the preparation and the pasty or liquid grouting composition is produced by adding water to the mixture of the pulverulent alkali silicate bonding agent component and the powder component.

15. The method as claimed in claim 14, wherein the pulverulent alkali silicate bonding agent component has a content of 2.5–25% by wt. in the prepared mixture before the addition of the water.

16. The method as claimed in claim 15, wherein the mixture is mixed with about 5–25% by wt. water.

17. The method as claimed in claim 1, wherein a powder component is used which has an activated silicon dioxide component.

18. The method as claimed in claim 17, wherein at least one material is used as the activated silicon dioxide component from a group, the group including pyrogenic silica, precipitated silica, silica dust, glass flour and fly ash.

19. The method as claimed in claim 18, wherein a powder component is used which, in addition to the activated silicon dioxide component, contains at least one further activated component from a group of activated components, the group of activated components including activated aluminium oxy components and the pozzuolanic components, wherein the pozzuolanic components comprises fly ash, electrostatic filter ash, trass, burnt oil shale, ground blast furnace slag and ground foundry sands.

20. The method as claimed in claim 1, wherein a powder component is used in which the amount of the activated silicon dioxide component in the reactive mixture corresponds approximately to 5 to 50% wt. of the amount of the activated aluminium oxy component.

21. The method as claimed in claim 20, wherein a powder component is used in which the activated aluminium oxy component comprises an aluminium oxide, an aluminium hydroxide and/or an aluminium silicate.

* * * * *

UNITED STATES PATENT AND TRADEMARK OFFICE
CERTIFICATE OF CORRECTION

PATENT NO. : 6,635,316 B1
DATED : October 21, 2003
INVENTOR(S) : Muller et al.

It is certified that error appears in the above-identified patent and that said Letters Patent is hereby corrected as shown below:

Column 5,
Lines 53, 55, 57, 60 and 63, please delete "claim 1," and insert -- Claim 1, --.

Column 6,
Lines 1, 4, 23, 37 and 53, please delete "claim 1," and insert -- Claim 1, --.
Line 8, please delete "claim 8," and insert -- Claim 8, --.
Lines 11 and 18, please delete "claim 9," and insert -- Claim 9, --.
Line 15, please delete "claim 10," and insert -- Claim 10, --.
Line 21, please delete "claim 12," and insert -- Claim 12, --.
Line 31, please delete "claim 14," and insert -- Claim 14, --.
Line 35, please delete "claim 15," and insert -- Claim 15, --.
Line 40, please delete "claim 17," and insert -- Claim 17, --.
Line 44, please delete "claim 18," and insert -- Claim 18, --.
Line 58, please delete "claim 20," and insert -- Claim 20, --.

Signed and Sealed this

Fourth Day of January, 2005

JON W. DUDAS
*Director of the United States Patent and Trademark Office*